(12) United States Patent
Na et al.

(10) Patent No.: US 11,872,494 B2
(45) Date of Patent: Jan. 16, 2024

(54) METHOD FOR CHANGING GAME PARAMETER

(71) Applicant: FOUNDATION OF SOONGSIL UNIVERSITY-INDUSTRY COOPERATION, Seoul (KR)

(72) Inventors: Hyeon Suk Na, Seoul (KR); Min Gyu Jeon, Gwangmyeong-si (KR); Chi Yeon Hwang, Bucheon-si (KR)

(73) Assignee: FOUNDATION OF SOONGSIL UNIVERSITY-INDUSTRY COOPERATION, Seoul (KR)

( * ) Notice: Subject to any disclaimer, the term of this patent is extended or adjusted under 35 U.S.C. 154(b) by 153 days.

(21) Appl. No.: 17/436,114

(22) PCT Filed: Dec. 27, 2019

(86) PCT No.: PCT/KR2019/018538
§ 371 (c)(1),
(2) Date: Sep. 3, 2021

(87) PCT Pub. No.: WO2020/179996
PCT Pub. Date: Sep. 10, 2020

(65) Prior Publication Data
US 2022/0143511 A1    May 12, 2022

(30) Foreign Application Priority Data

Mar. 7, 2019  (KR) .................. 10-2019-0026371
Jun. 4, 2019   (KR) .................. 10-2019-0066033

(51) Int. Cl.
*A63F 13/71*    (2014.01)
*A63F 13/792*   (2014.01)

(52) U.S. Cl.
CPC ............ *A63F 13/71* (2014.09); *A63F 13/792* (2014.09); *A63F 2300/408* (2013.01); *A63F 2300/532* (2013.01)

(58) Field of Classification Search
CPC ....................................... A63F 13/71
See application file for complete search history.

(56) References Cited

U.S. PATENT DOCUMENTS 10,726,107 B2 *  7/2020  Cunningham ........ H04L 9/0891
10,946,291 B1 *  3/2021  Harris ................... A63F 13/85
(Continued)

FOREIGN PATENT DOCUMENTS

| JP | 2002018136 A | 1/2002 |
|---|---|---|
| KR | 1020150129098 A | 11/2015 |
| KR | 101870112 B1 | 6/2018 |

OTHER PUBLICATIONS

International Search Report and Written Option for International Application PCT/KR2019/018538, filed Dec. 27, 2019, dated Apr. 6, 2020.

(Continued)

*Primary Examiner* — Jay Trent Liddle
(74) *Attorney, Agent, or Firm* — Bond, Schoeneck & King, PLLC; George R. McGuire

(57) ABSTRACT

Disclosed are a method for changing a game parameter and a client for performing same. The client comprises: a processor for executing a game program; and a transceiver for communicating with a blockchain node of a blockchain network storing a first blockchain, wherein the processor may authenticate a user account and perform a first event of the game program accessed by the user account, the transceiver may transmit, to the blockchain node, a completion signal of the first event including information about the client when the first event is completed and receive, from the blockchain node, a request signal for generating a second (Continued)

event, the processor may generate the second event on the basis of the request signal for generating the second event, and the transceiver may transmit, to the blockchain node, information about the second event.

12 Claims, 6 Drawing Sheets

(56) References Cited

U.S. PATENT DOCUMENTS

| | | | |
|---|---|---|---|
| 11,288,735 B1* | 3/2022 | Kao | G06Q 30/0617 |
| 2013/0065670 A1 | 3/2013 | Michaelson et al. | |
| 2018/0114403 A1* | 4/2018 | Jayachandran | G07F 17/3244 |
| 2018/0211486 A1 | 7/2018 | Blatstein et al. | |
| 2019/0028265 A1* | 1/2019 | Bisti | A63F 13/792 |
| 2019/0232172 A1* | 8/2019 | Malan | G06Q 20/401 |
| 2020/0155944 A1* | 5/2020 | Witchey | G06F 16/2379 |
| 2020/0202668 A1* | 6/2020 | Cotta | G07F 17/3244 |
| 2020/0324201 A1* | 10/2020 | Cunningham | A63F 13/497 |
| 2021/0106920 A1* | 4/2021 | Lim | H04L 65/40 |

OTHER PUBLICATIONS

Segev, Ron. Why blockchain is a game-changer for he igaming industry. pp. 1-5, Oct. 3, 2017 [Retrieved on Mar. 26, 2020] Retrieved from <https://www.igamingbusiness.com/why-blockchain-game-changer-igaming-industry> See pp. 1-3.

* cited by examiner

METHOD FOR CHANGING GAME PARAMETER

TECHNICAL FIELD

The following description relates to a technology for changing a game parameter by using a blockchain.

BACKGROUND ART

A blockchain is a decentralized public ledger managed in a peer-to-peer (P2P) network. The blockchain is a globally shared, decentralized database. Security and immutability are high because all nodes participating in a blockchain network copy and possess the same data. To change data, nodes are required to pay a certain fee to generate and distribute transactions on the blockchain network.

DISCLOSURE

According to an aspect, there is provided a client including a processor configured to execute a game program, and a transceiver configured to communicate with a blockchain node of a blockchain network storing a first blockchain. The processor may be configured to authenticate a user account, and perform a first event of the game program accessed by the user account. When the first event is completed, the transceiver may be configured to transmit, to the blockchain node, a completion signal of the first event including information about the client, and receive, from the blockchain node, a request signal for generating a second event. The processor may be configured to generate the second event on the basis of the request signal for generating the second event. The transceiver may be configured to transmit, to the blockchain node, information about the second event.

According to another aspect, there is provided a blockchain node of a blockchain network storing a first blockchain including a transceiver configured to communicate with a client, and a processor. The transceiver may be configured to receive, from the client, a completion signal of a first event generated by completion of the first event of a game program by the client accessed by a user account. The processor may be configured to extract information about the client from the completion signal of the first event, determine whether the client first completes the game program on the basis of the information about the client and data of the first blockchain, generate first event completion information indicating information that the client first completes the game program when it is determined that the client first completes the game program, and provide a reward to the user account. The transceiver may be configured to transmit, to the client, a request signal for generating a second event of the game program, and receive, from the client, information about the second event. The processor may be configured to generate a first source code including the first event completion information and the information about the second event, convert the first source code into a first Ethereum virtual machine (EVM) byte code, generate a first transaction from the first EVM byte code, and distribute the first transaction to the blockchain network.

According to still another aspect, there is provided a system including a blockchain node of a blockchain network storing a first blockchain and a client connected to the blockchain node in a wired or wireless manner. The client accessed by a user account may be configured to perform a first event of a game program, and transmit, to the blockchain node, a completion signal of the first event including information about the client when the first event is completed by the client. The blockchain node may be configured to extract, from the completion signal of the first event, the information about the client, determine whether the client first completes the game program on the basis of the information about the client and data of the first blockchain, generate first event completion information indicating information that the client first completes the game program when it is determined that the client first completes the game program, provide a reward to the user account, and transmit, to the client, a request signal for generating a second event of the game program. The client may be configured to receive, from the blockchain node, the request signal for generating the second event, generate the second event on the basis of the request signal for generating the second event, and transmit, to the blockchain node, information about the second event. The blockchain node may be configured to receive, from the client, the information about the second event, generate a first source code including the first event completion information and the information about the second event, convert the first source code into a first EVM byte code, generate a first transaction from the first EVM byte code, and distribute the first transaction to the blockchain network.

According to still another aspect, there is provided a client including a processor configured to execute a game program, and a transceiver configured to communicate with a blockchain node of a blockchain network storing a second blockchain. The processor may be configured to authenticate a user account, deduct, by the client accessed by the user account, a reward obtained as a price for first completing a first event of the game program, change a parameter of the game program in response to the deducted reward, and execute the game program in which the changed parameter is reflected. The transceiver may be configured to transmit, to the blockchain node, a request signal for changing the game program including information about the changed parameter and information about the deducted reward.

According to still another aspect, there is provided a blockchain node of a blockchain network storing a second blockchain including a transceiver configured to communicate with a client; and a processor. The transceiver may be configured to receive a request signal for changing a game program received from the client accessed by a user account. The processor may be configured to extract, from the request signal, information about a changed parameter of the game program and information about a reward of the user account deducted as a price for changing the parameter, generate a second source code including information about the changed parameter and information about the deducted reward, convert the second source code into a second EVM byte code, generate a second transaction from the second EVM byte code, and distribute the second transaction to the blockchain network.

According to still another aspect, there is provided a method for generating a game event, the method including performing, by a client accessed by a user account, a first event of a game program, transmitting, to a blockchain node of a blockchain network storing a first blockchain, a completion signal of the first event including information about the client when the first event is completed by the client, receiving, from the blockchain node, a request signal for generating a second event, generating the second event on the basis of the request signal for generating the second event, and transmitting, to the blockchain node, information about the second event.

According to still another aspect, there is provided a method for generating a game event, the method including extracting, by a blockchain node of a blockchain network storing a first blockchain, information about a client from a completion signal of a first event generated by completion of the first event of a game program by the client accessed by a user account, determining whether the client first completes the game program on the basis of the information about the client and data of the first blockchain, generating first event completion information indicating information that the client first completes the game program when it is determined that the client first completes the game program, and providing a reward to the user account, transmitting, to the client, a request signal for generating a second event of the game program, receiving, from the client, information about the second event, generating a first source code including the first event completion information and the information about the second event, converting the first source code into a first EVM byte code, generating a first transaction from the first EVM byte code, distributing the first transaction to the blockchain network, and generating a second blockchain by connecting a first block including the first transaction to the first blockchain.

According to still another aspect, there is provided a method for generating a game event, the method including performing, by a client accessed by a user account, a first event of a game program, transmitting, to a blockchain node of a blockchain network storing a first blockchain, a completion signal of the first event including information about the client when the first event is completed by the client, extracting, by the blockchain node, the information about the client from the completion signal of the first event, determining, by the blockchain node, whether the client first completes the game program on the basis of the information about the client and data of the first blockchain, generating first event completion information indicating information that the client first completes the game program when it is determined that the client first completes the game program, and providing a reward to the user account, transmitting, by the blockchain node, to the client, a request signal for generating a second event of the game program, receiving, by the client, from the blockchain node, the request signal for generating the second event, generating, by the client, the second event on the basis of the request signal for generating the second event, transmitting, by the client, to the blockchain node, information about the second event, receiving, by the blockchain node, from the client, the information about the second event, generating, by the blockchain node, a first source code including the first event completion information and the information about the second event, converting, by the blockchain node, the first source code into a first EVM byte code, generating, by the blockchain node, a first transaction from the first EVM bytecode, and distributing, by the blockchain node, the first transaction to the blockchain network.

According to still another aspect, there is provided a method for generating a game event, the method including deducting, by a client accessed by a user account, a reward obtained as a price for first completing a first event of a game program, and changing a parameter of the game program in response to the deducted reward, transmitting, to a blockchain node of a blockchain network storing a second blockchain, a request signal for changing the game program including information about the changed parameter and information about the deducted reward, and executing the game program to which the changed parameter is reflected.

According to still another aspect, there is provided a method for generating a game event, the method including extracting, by a blockchain node of a blockchain network storing a first blockchain, from a request signal for changing a game program received from a client accessed by a user account, information about a changed parameter of the game program and information about a reward of the user account deducted as a price for changing the parameter, generating a second source code including information about the changed parameter and information about the deducted reward, converting the second source code into a second EVM byte code, generating a second transaction from the second EVM bytecode, and distributing the second transaction to the blockchain network.

DETAILED DESCRIPTION

Figure 1:
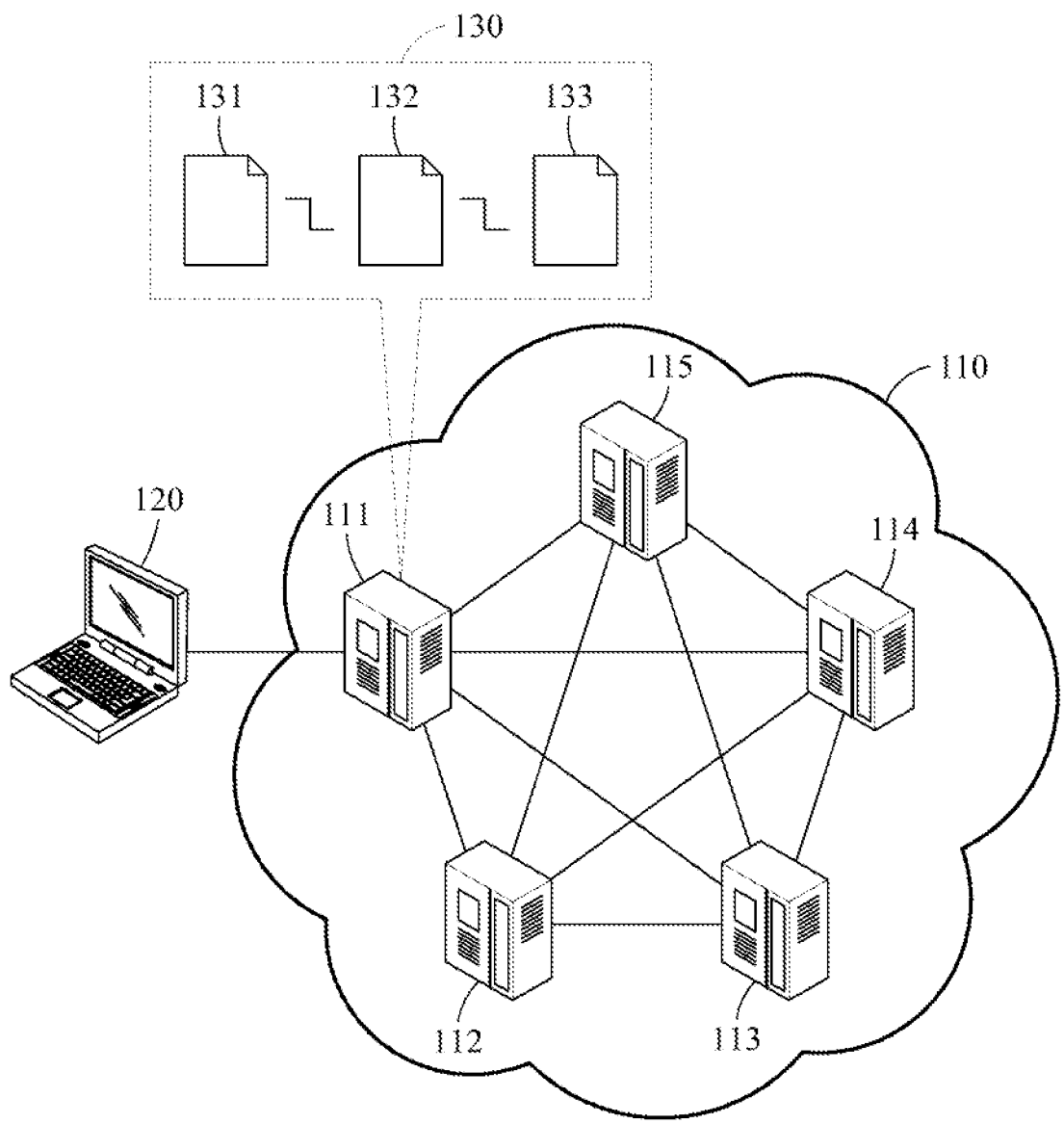
FIG. 1 is a diagram illustrating a system for generating a game event or changing a game parameter by using a blockchain.

Hereinafter, example embodiments will be described in detail with reference to the accompanying drawings. However, various modifications may be made to the example embodiments, and thus, the scope of the patent application should not be construed as limited to the example embodiments set forth herein. It should be understood that all changes, equivalents, and replacements to the example embodiments are included within the scope.

The terminology used herein is for the purpose of describing particular example embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, operations, elements, and/or components, but do not preclude the presence or addition of one or more other features, integers, operations, elements, components, and/or groups thereof.

Unless otherwise defined, all terms, including technical and scientific terms, used herein have the same meaning as commonly understood by those skilled in the art to which the example embodiments pertain. Terms, such as those defined in commonly used dictionaries, are to be interpreted as having a meaning that is consistent with their meaning in the context of the relevant art, and are not to be interpreted in an idealized or overly formal sense unless expressly so defined herein.

In addition, in the description with reference to the accompanying drawings, the same components are assigned with the same reference numerals regardless of the numerals in the drawings, and the redundant description thereof will be omitted. In the description of example embodiments, a detailed description of a well-known related technology will be omitted when it is deemed that such description will unnecessarily obscure the gist of the example embodiments.

Hereinafter, a maze escaper game will be exemplified for convenience of description, however, the present invention may also be applied to the operation of various types of games including the maze escaper game.

FIG. 1 is a diagram illustrating a system for generating a game event or changing a game parameter by using a blockchain.

According to an example embodiment, the system may be involved in the operation of a game program by using a blockchain network 110. The system may generate an event of the game program and distribute information about the generated event to the blockchain network 110. The system may change a parameter of the game program and distribute the changed parameter to the blockchain network 110.

Here, the game program may include at least one of a personal computer (PC) game, a video game, a wireless terminal game, and a network game. The game may include a single player game, and/or a multiplayer game for at least two or more players. The game may include a massive multiplayer online role-playing game (MMORPG), a massively multiplayer online social network game (MMOSNG), and a massively multiplayer online simulation game (MMOSLG), but the type of game is not limited thereto.

A user may be referred to as a user or a player. The user may be embodied in the game program through a device identifier, a channel identifier, and a game account identifier that access the game program.

A game environment variable may mean a parameter that is changeable in the game program. The game environment variable may have the same value in the same game program. For example, the game environment variable may include a difficulty level of the game program. Hereinafter, the game environment variable may be referred to as a parameter.

Ethereum is a decentralized platform on which decentralized applications (dApps) using a smart contract may be executed. The smart contract is a program for a blockchain that may be executed according to rules defined autonomously by a programmer with respect to ownership and transaction format. A node participating in Ethereum copies a block through an Ethereum virtual machine (EVM), and distributes a transaction or executes a smart contract.

There are not many blockchain-based games developed thus far. Since the processing speed of a blockchain is slow compared to a central server type, a pet raising game, a board game, a card game, a puzzle, or a maze game, which is less sensitive to speed, is suitable for a blockchain-based game, but is not limited thereto.

According to an example embodiment, the system may use the blockchain network 110 to grant a user a right to operate a game program. The user of the game program may change an environment variable of the game program by using the blockchain network 110. Through user participation, a decentralized game program may be operated, the user's opinion may be reflected in the operation of the game program, and the operation of the game program may be fairer and more transparent. For example, the user may adjust a difficulty level of the game program by using the blockchain network 110. The adjusted environment variable may be reflected in the block and distributed through the blockchain network 110.

The system may provide a reward to a user who has achieved a specific condition. Here, the specific condition may mean, for example, completion of an event of a game program. The user may deduct the reward and participate in operation of the game program. As a result, it is possible to control user participation at an appropriate level while granting an operating right to the user who has contributed to the game program.

The system may use the blockchain network 110 to support economic activities such as exchange of a reward, item or good. By using the blockchain network 110, the system may prevent forgery or falsification of information about a reward, item or good. Here, the reward may include a coin or token as a cryptocurrency.

The system may provide a blockchain-based user-participatory game program capable of maintaining and updating a game safely and transparently. By using a blockchain for game operation, it is possible to reduce a human and economic burden of a developer required for management and update, and to monitor and prevent an unfair practice in which a developer unilaterally manipulates a game difficulty level or item enhancement probability or an unfair practice that induces users to purchase an item.

By distributing some game environments and object variables that have been managed by a game developer to the blockchain so that all users of the blockchain network manage a game environment variable together, the game developer may reduce the burden and cost required for continuous server management and update. Conversely, once the game is distributed to the blockchain, a game element and a difficulty level may not be controlled and manipulated unilaterally and collectively as intended by the game developer, thereby monitoring and preventing possible unfair actions of the developer. As such, by introducing blockchain technology, the system may have a positive impact on both a player and a game developer while reducing the developer's cost burden.

A user may not only earn a token by winning a game, but also use his/her token to update the game or participate in difficulty level adjustment. A player may increase a difficulty level of the game by paying certain tokens. When the difficulty level is too low, the supply of tokens issued as a reward for winning the game rapidly increases, and a value of the issued tokens rapidly collapses. Therefore, users have a greater incentive to increase a game level by paying tokens instead of obtaining tokens as a reward for winning the game. As the difficulty level of the game increases, the value of the tokens increases, and thus players are more eager to obtain tokens issued as a reward for winning the game rather than paying tokens to change the game level.

According to an example embodiment, the system includes a blockchain node 111 of the blockchain network 110 storing a first blockchain 130 and a client 120 connected to the blockchain node 111 in a wired or wireless manner. The first blockchain 130 has a structure in which one or more blocks 131, 132, and 133 are connected. The blockchain network 110 may include one or more blockchain nodes 111, 112, 113, 114, and 115.

The client 120 accessed by a user account may perform a first event of a game program. Here, the first event, which is a mission in the game program that is required to be completed, may include a game, a quest, or a dungeon.

When the first event is completed by the client 120, the client 120 may transmit, to the blockchain node 111, a completion signal of the first event including information about the client 120. When the client 120 first completes the first event, the client 120 may transmit, to the blockchain node 111, a completion signal including information indicating that the first event is first completed.

The blockchain node 111 may extract information about the client 120 from the completion signal of the first event. The blockchain node 111 may determine whether the client 120 first completes the game program on the basis of the information about the client 120 and data of the first blockchain 130.

When it is determined that the client 120 first completes the game program, the blockchain node 111 may generate first event completion information indicating information that the client 120 first completes the game program, and provide a reward to the user account. Here, the reward may include a tradable coin or token.

The blockchain node 111 may transmit, to the client 120, a request signal for generating a second event of the game program. The second event may mean an event generated next to the first event.

The client 120 may receive, from the blockchain node 111, the request signal for generating the second event. The client 120 may generate the second event on the basis of the request signal for generating the second event. The client 120 may transmit, to the blockchain node 111, information about the second event.

According to another example embodiment, the client 120 may transmit, to the blockchain node 111, a completion signal including the information about the second event, together with the information indicating that the first event is first completed. The blockchain node 111 may extract the information about the second event transmitted together with the completion signal of the first event. When it is determined that the client 120 first completes, the blockchain node 111 may generate the second event by using the extracted information about the second event.

The blockchain node 111 may receive, from the client 120, the information about the second event. The blockchain node 111 may generate a first source code including the first event completion information and the information about the second event. The blockchain node 111 may convert the first source code into a first EVM byte code. The blockchain node 111 may generate a first transaction from the first EVM bytecode. The blockchain node 111 may distribute the first transaction to the blockchain network.

As a result, a reward for completing the first event may be paid to the user account, and the information about the second event may be provided to all the blockchain nodes 111, 112, 113, 114, and 115. The provided information may not be forged or falsified due to the nature of a blockchain.

For example, an event may include a maze escaper game. The system may delegate the management and operation of the maze escaper game to the user. The system may induce user participation through the blockchain, and users may control the difficulty level of the game program through profit-seeking behaviors of the users. The maze escaper game may be included in a smart contract. The smart contract may be executed by the blockchain nodes 111, 112, 113, 114, and 115. Here, the blockchain node may include an EVM. The blockchain nodes 111, 112, 113, 114, and 115 may access the blockchain network 110 to update information and change data. The smart contract may include the user's device, and various commands and definitions. The following examples are described assuming Ethereum for convenience.

Regarding the maze escaper game, there is only one maze in an Ethereum network that no one has escaped from yet. The user who first escapes a maze becomes a winner of the maze escaper game, and a next maze escaper game is randomly generated from a client accessed by the user account.

The maze escaper game may have a fork in a road, a trap, and a threshold value. A difficulty level of the maze escaper game may be determined by a combination of three factors.

The fork refers to two divergent roads, and the number of forks may be referred to as a maze length. A maze length L may mean the number of forks in the maze. The system may enhance maze generation and security of a solution by following a decentralization policy below. A solution to the maze escaper game with the maze length L is always 1 L. This is (1, 1, . . . , 1), which means L strings of "1". Here, "1" means TRUE. "0" means FALSE. Whether a value of the fork is "0" or "1" is randomly determined by the client 120 accessed by the user account at the moment the user first selects a road. The only strategy to escape the maze is to search repeatedly, in a manner of mining to find a nonce value in the blockchain.

The trap is an obstacle the user needs to overcome and NTraps is the number of traps. For example, the maze escaper game may include three monster traps and four rescue traps.

From when the user enters a wrong way at the fork, the system notifies the user that the user has entered the wrong way when the user encounters a threshold value H-lth fork. A threshold value H may serve as another factor that adjusts the difficulty level. For example, it is possible to assume a fork in which a road selected by a player first becomes "0" instead of "1". When H is equal to 1 (H=1), the system blocks the user so that the user immediately goes back and changes the selection. When H is equal to or greater than 2 (H>2), the system blocks the player only after the user passes the H-lth fork from hence. Therefore, the best strategy for the player is to figure out which fork the first "0" is by going back step by step at the moment the system blocks the player. When the first fork is figured out, an H value of the maze escaper game is perceived. Thus, from the moment of next blockage, the user may go back by exactly H, reverse the selection, and return. As such, the system may maintain the maze length L below a predetermined length Lmax while increasing the game level by introducing the threshold value as a game element. Table 1 below is a pseudocode of an algorithm for determining the three variables of the maze escaper game.

TABLE 1

NextMazeParameters( )
L <- L + BuyingWall - SellingWall
if(L > $L_{max}$ ) then
   if(H=NTraps=0.5$L_{max}$) then
     Maze Escaper ends and exit
   else
     L <- 0.7$L_{max}$
     if(H=0.5$L_{max}$) then
       NTraps++ and exit
     else
       H++

Referring to Table 1, the maze length L may be increased or decreased by the number of walls bought or sold by the user. Here, the number of walls may mean the number of forks. If the maze length L is equal to or greater than Lmax through the user's wall buying, it is determined whether the threshold value H is equal to the number of traps NTraps and 0.5 Lmax, otherwise L is decreased to 0.7 Lmax. Here, it is determined whether the threshold value H is equal to 0.5 Lmax, otherwise the threshold value H is increased. If the threshold value H is equal to 0.5 Lmax, the number of traps NTraps is increased. As such, the system may adjust the difficulty level by selecting variables to adjust in an order of L, H, and NTraps of the maze escaper game.

A user who is a winner of a previous maze escaper game receives a preset escape reward, and is recorded as a winner on the blockchain. The user may buy or sell a wall to participate in a game environment variable update. The number of maze walls bought or sold on a network until the end of one game is reflected to determine a level of a next maze.

The number of mazes and the number of winners mean the number of mazes and the number of winners thus far. An Ethereum client that connects a player who has just successfully escaped a maze needs to verify whether the player is a real winner. For the verification of a winner, a node needs to verify whether the current number of winners is one less than a maze number that the player has just escaped from. A maze string and a trap string are defined as follows. There are several types of fork in the road: left turn+straight forward represented by "0", straight+right turn represented by "1", and left turn+right turn represented by "2". The maze string is determined by a type of fork and a maze length. When there is no trap, the trap string is "0", and represent seven traps from "1" to "7", and is determined through an order of the seven traps. The maze string and the trap string are randomly generated on a device of a previous winner, and are recorded on the blockchain as part of a winner declaration transaction.

Figure 2:
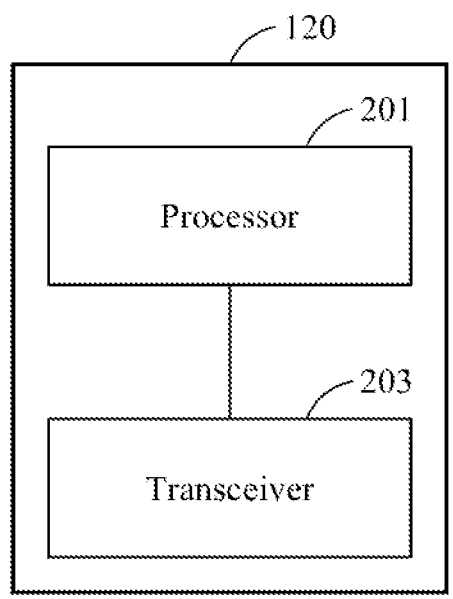
FIG. 2 is a diagram illustrating a detailed configuration of a client.

FIG. 2 is a diagram illustrating a detailed configuration of a client.

According to an example embodiment, the client 120 includes a processor 201 that executes a game program and a transceiver 203 that communicates with a blockchain node of a blockchain network storing a first blockchain.

The processor 201 may authenticate a user account. The processor 201 may perform a first event of the game program accessed by the user account.

When the first event is completed, the transceiver 203 may transmit, to the blockchain node, a completion signal of the first event including information about the client 120. The transceiver 203 may receive, from the blockchain node, a request signal for generating a second event.

The processor 201 may generate the second event on the basis of the request signal for generating the second event. The transceiver 203 may transmit, to the blockchain node, information about the second event.

According to another example embodiment, the client 120 includes the processor 201 that executes a game program, and the transceiver 203 that communicates with a blockchain node of a blockchain network storing a second blockchain.

The processor 201 authenticates a user account. The client 120 accessed by the user account deducts a reward obtained as a price for first completing a first event of the game program, changes a parameter of the game program in response to the deducted reward, and executes the game program in which the changed parameter is reflected.

The transceiver 203 may transmit, to the blockchain node, a request signal for changing the game program including information about the changed parameter and information about the deducted reward.

Figure 3:
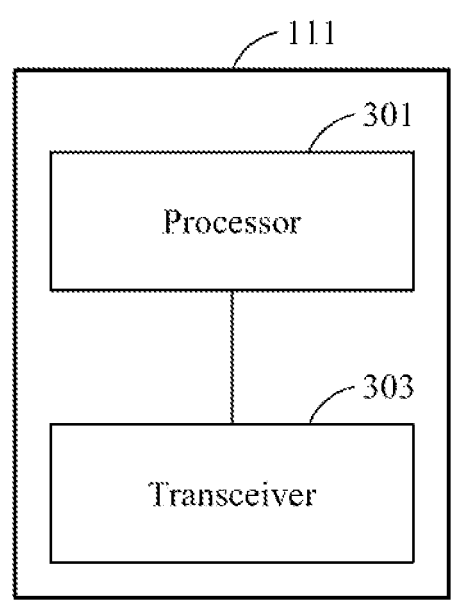
FIG. 3 is a diagram illustrating a detailed configuration of a blockchain node.

FIG. 3 is a diagram illustrating a detailed configuration of a blockchain node.

The blockchain node 111 is included in a blockchain network storing a first blockchain. The blockchain node 111 includes a transceiver 303 that communicates with the client 120, and a processor 301.

The transceiver 303 receives, from a client, a completion signal of a first event generated by completion of the first event of a game program by the client accessed by a user account. According to another example embodiment, the transceiver 303 may receive information about a second event, together with the completion signal of the first event.

The processor 301 extracts information about the client from the completion signal of the first event, and determines whether the client first completes the game program on the basis of the information about the client and data of the first blockchain. When it is determined that the client first completes the game program, the processor 301 generates first event completion information indicating information that the client first completes the game program, and provides a reward to the user account. In addition, the processor 301 may generate a second event by using the received information about the second event.

The transceiver 303 may transmit, to the client, a request signal for generating the second event of the game program. The transceiver 303 may receive, from the client, the information about the second event.

The processor 301 generates a first source code including the first event completion information and the information about the second event. The processor 301 converts the first source code into a first EVM byte code. The processor 301 generates a first transaction from the first EVM byte code. The processor 301 may distribute the first transaction to the blockchain network.

According to another example embodiment, the blockchain node 111 of a blockchain network storing a second blockchain includes the transceiver 303 that communicates with a client, and the processor 301.

The transceiver 303 receives a request signal for changing a game program received from the client accessed by a user account.

The processor 301 may extract, from the request signal, information about a changed parameter of the game program, and information about a reward of the user account deducted as a price for changing the parameter. The processor 301 may generate a second source code including information about the changed parameter and information about the deducted reward. The processor 301 may convert the second source code into a second EVM byte code and generate a second transaction from the second EVM byte code. The processor 301 may distribute the second transaction to the blockchain network.

Figure 4:
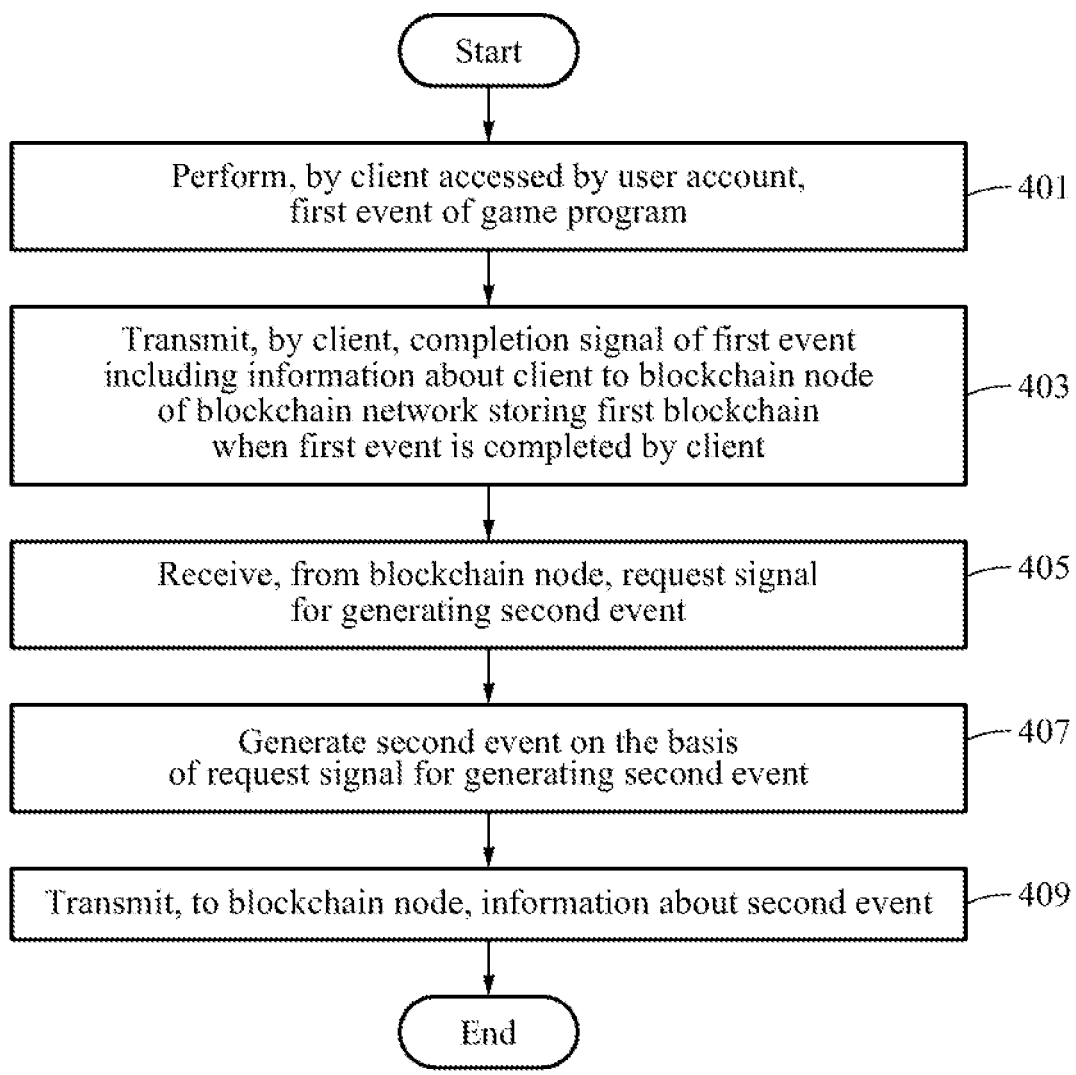
FIG. 4 is a flowchart illustrating an operation of generating a game event of a client according to an example embodiment.

FIG. 4 is a flowchart illustrating an operation of generating a game event of a client according to an example embodiment.

According to an example embodiment, in step 401, the client 120 accessed by a user account may perform a first event of a game program. In step 403, when the first event is completed by the client 120, the client 120 may transmit a completion signal of the first event including information about the client to a blockchain node of a blockchain network storing a first blockchain. Alternatively, the client 120 may transmit information about a second event together with the completion signal of the first event at once. In step 405, the client 120 may receive, from the blockchain node, a request signal for generating the second event. In step 407, the client 120 may generate the second event on the basis of the request signal for generating the second event. In step 409, the client 120 may transmit, to the blockchain node, the information about the second event.

Figure 5:
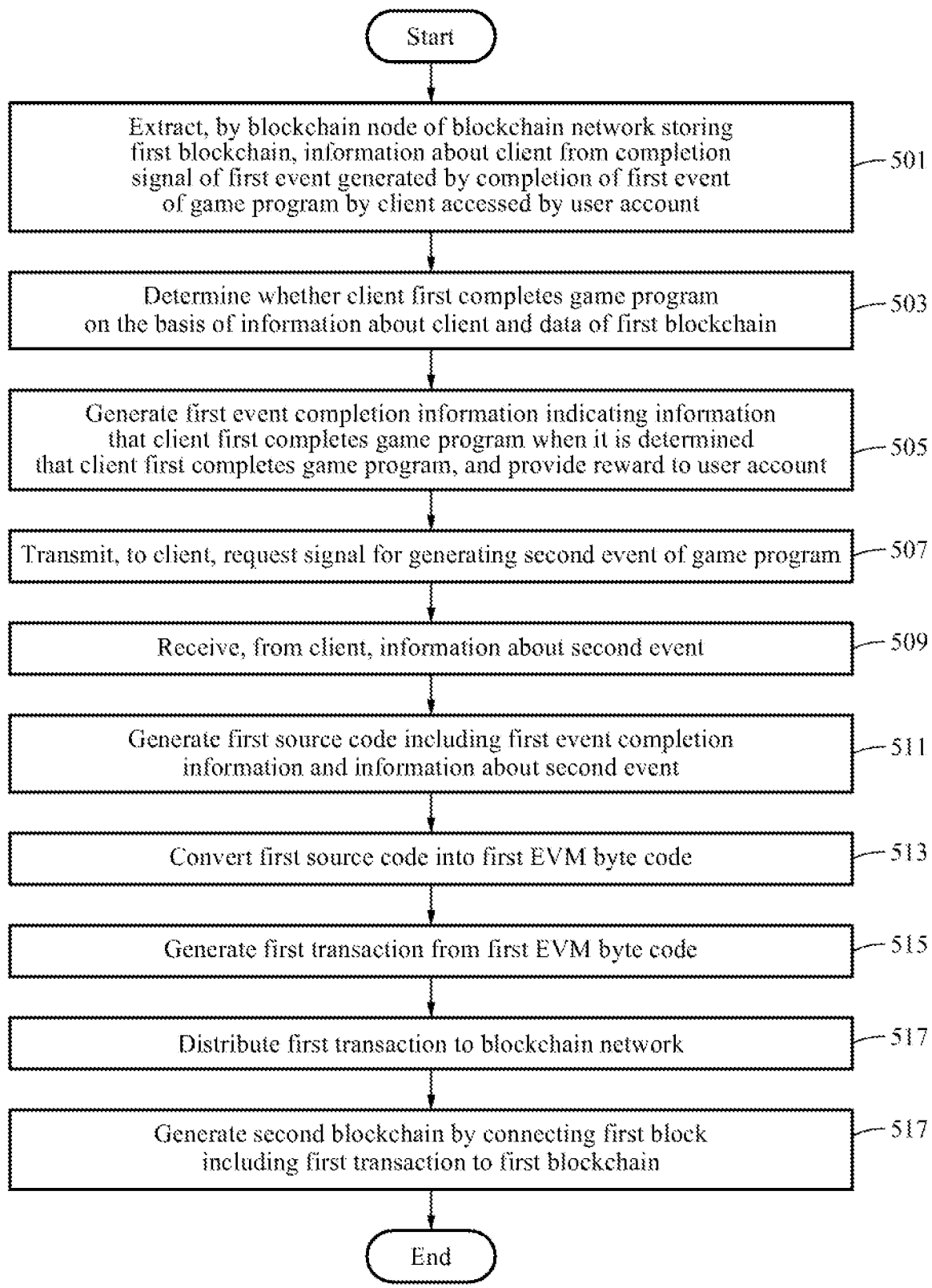
FIG. 5 is a flowchart illustrating an operation of generating a game event of a blockchain node according to an example embodiment.

FIG. 5 is a flowchart illustrating an operation of generating a game event of a blockchain node according to an example embodiment.

According to an example embodiment, in step 501, the blockchain node 111 may extract information about a client from a completion signal of a first event generated by completion of a first event of a game program by the client accessed by a user account. In step 503, the blockchain node 111 may determine whether the client first completes the game program on the basis of the information about the client and data of a first blockchain.

In step 505, when it is determined that the client first completes the game program, the blockchain node 111 may generate first event completion information indicating information that the client first completes the game program, and provide a reward to the user account.

In step 507, the blockchain node 111 may transmit, to the client, a request signal for generating a second event of the game program. In step 509, the blockchain node 111 may receive, from the client, information about the second event.

In step 511, the blockchain node 111 may generate a first source code including the first event completion information and the information about the second event. In step 513, the blockchain node 111 may convert the first source code into a first EVM byte code. In step 515, the blockchain node 111 may generate a first transaction from the first EVM byte code. In step 517, the blockchain node 111 may distribute the first transaction to a blockchain network. In step 519, the blockchain node 111 may generate a second blockchain by connecting a first block including the first transaction to the first blockchain.

Figure 6:
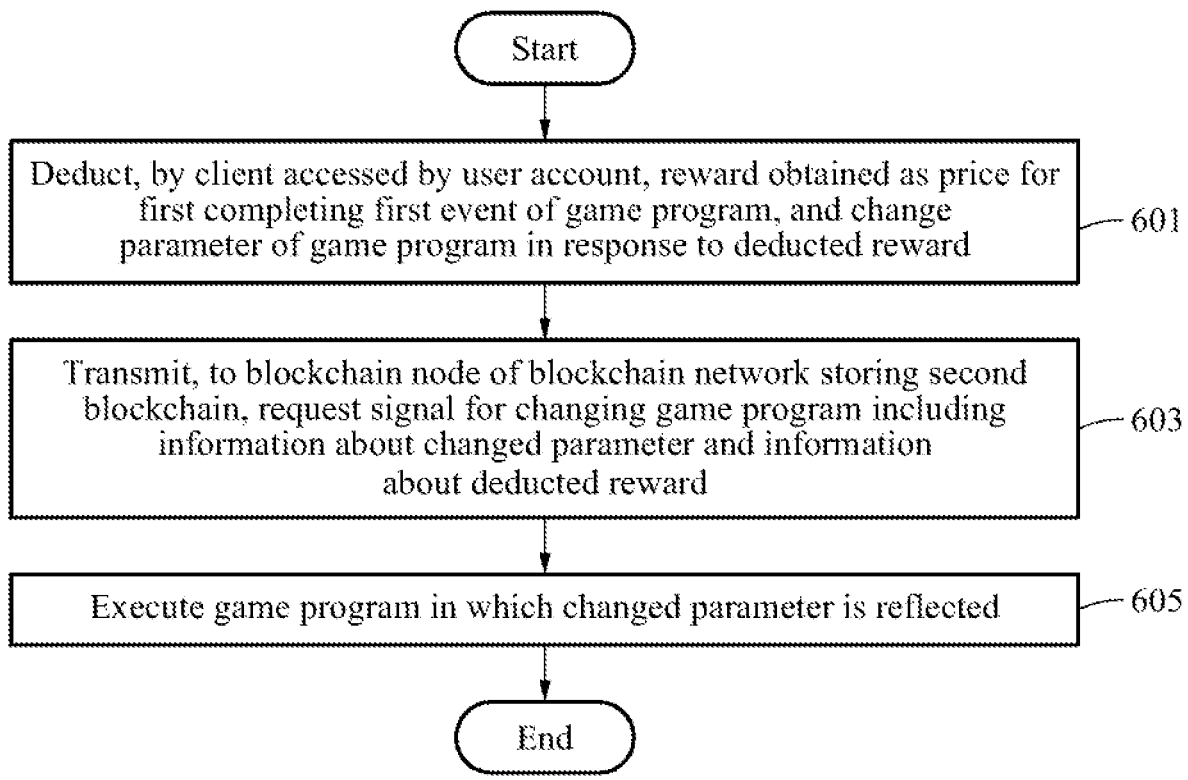
FIG. 6 is a flowchart illustrating an operation of changing a game parameter of a client according to another example embodiment.

FIG. 6 is a flowchart illustrating an operation of changing a game parameter of a client according to another example embodiment.

According to an example embodiment, in step 601, the client 120 may deduct a reward obtained as a price for first completing a first event of a game program, and change a parameter of the game program in response to the deducted reward. In step 603, the client 120 may transmit, to a blockchain node of a blockchain network storing a second blockchain, a request signal for changing the game program including information about the changed parameter and information about the deducted reward. In step 605, the client 120 may execute the game program in which the changed parameter is reflected.

Figure 7:
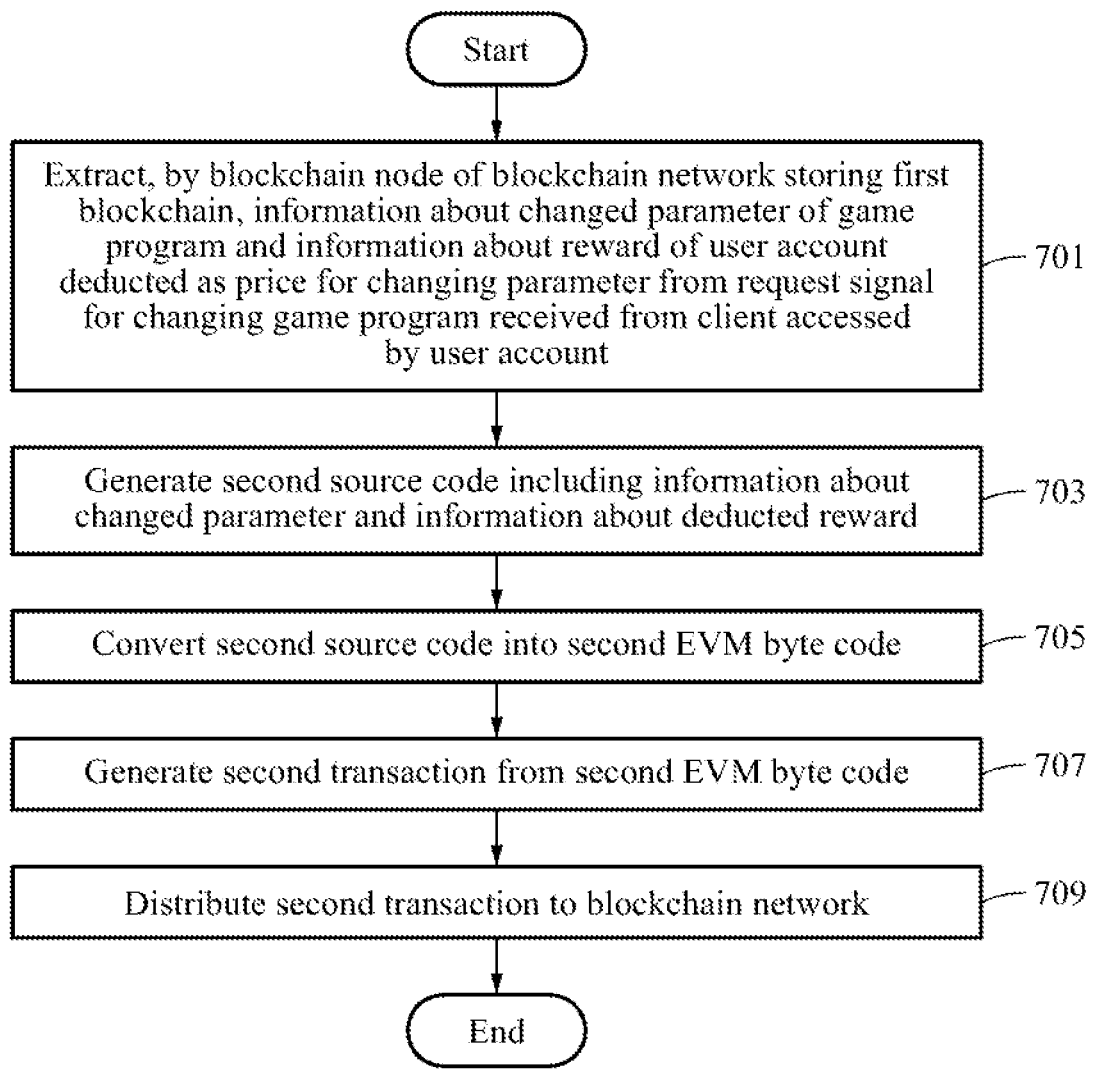
FIG. 7 is a flowchart illustrating an operation of changing a game parameter of a blockchain node according to another example embodiment.

FIG. 7 is a flowchart illustrating an operation of changing a game parameter of a blockchain node according to another example embodiment.

According to another example embodiment, in step 701, the blockchain node 111 may extract, from a request signal for changing a game program received from a client accessed by a user account, information about a changed parameter of the game program and information about a reward of the user account deducted as a price for changing the parameter. In step 703, the blockchain node 111 may generate a second source code including information about the changed parameter and information about the deducted reward. In step 705, the blockchain node 111 may convert the second source code into a second EVM byte code. In step 707, the blockchain node 111 may generate a second transaction from the second EVM byte code. In step 709, the blockchain node 111 may distribute the second transaction to a blockchain network.

The methods according to the example embodiments may be recorded in non-transitory computer-readable media including program instructions to implement various operations of the example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

The invention claimed is:

1. A client used by a game user of a game program distinct from a game developer of the game program, the client comprising:
 a processor configured to execute the game program; and
 a transceiver configured to communicate with a blockchain node of a blockchain network storing a first blockchain or a second blockchain,
 wherein the processor is further configured to:
 authenticate a user account by executing the game program,
 store, by the client accessed by the user account, a reward obtained as a price for executing an event of the game program in the blockchain node as the first blockchain through the transceiver,
 use the reward stored as the first blockchain to change a parameter of the game program,
 execute the game program in which the changed parameter is reflected, and transmit, to the blockchain node, information about the second blockchain including information about the used reward through the transceiver.

2. The client of claim 1, wherein the reward stored as the first blockchain is a blockchain-based cryptocurrency.

3. The client of claim 2, wherein the cryptocurrency is a coin or token.

4. The client of claim 1, wherein the parameter is related to the difficulty of performing the event.

5. The client of claim 1, wherein the second blockchain further includes information on the changed parameter.

6. The client of claim 1, wherein the executing the event of the game program is completing the event first.

7. A blockchain node of a blockchain network storing a first blockchain, the blockchain node comprising:
- a transceiver configured to communicate with a client used by a game user of game program distinct from a game developer of the game program; and
- a processor configured to:
  - receive, from the client, a completion signal of a first event generated by a completion of the first event of the game program by the client connected by a user account of the game user,
  - provide a reward to the client in response to completing the first event based on the completion signal of the first event,
  - change a parameter of the game program according to a request of the client to change the parameter of the game program by deducting the reward, wherein the parameter of the game program corresponds to a game environment variable of the game program, and comprises a difficulty level of the game program, wherein the new version of the game program based on the changed parameter of the game program is provided by a different client of a different game user distinct from the game user.

8. A method for changing game parameter comprising:
- running a game program and executing a network game;
- giving a reward to a user according to performing an event in the network game;
- recording the reward based on a blockchain; and
- changing a parameter of the game program using the recorded reward.

9. The method for changing game parameter of claim 8, wherein the reward recorded is a blockchain-based cryptocurrency.

10. The method for changing game parameter of claim 9, wherein the cryptocurrency is a coin or token.

11. The method for changing game parameter of claim 8, wherein the parameter is related to the difficulty of performing the event.

12. The method for changing game parameter of claim 8, further comprising recording the information on the reward used for the change of the parameter based on the blockchain.

* * * * *